US008141447B2

(12) United States Patent
Beutler et al.

(10) Patent No.: US 8,141,447 B2
(45) Date of Patent: Mar. 27, 2012

(54) SPIRAL-TOOTHED GEAR WHEEL FOR RACK AND PINION STEERING

(75) Inventors: Olaf Beutler, Diepholz (DE); Waldemar Rogowski, Lotte/Wersen (DE); Remt Blankenspeck, Drebber (DE); Günter Lohfink, Bad Harzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 838 days.

(21) Appl. No.: 12/280,856

(22) PCT Filed: Feb. 28, 2007

(86) PCT No.: PCT/DE2007/000373
§ 371 (c)(1),
(2), (4) Date: Aug. 27, 2008

(87) PCT Pub. No.: WO2007/098744
PCT Pub. Date: Sep. 7, 2007

(65) Prior Publication Data
US 2009/0056488 A1    Mar. 5, 2009

(30) Foreign Application Priority Data
Mar. 2, 2006   (DE) .................. 10 2006 010 268

(51) Int. Cl.
*F16H 1/18*   (2006.01)
(52) U.S. Cl. ...................................... 74/424.5
(58) Field of Classification Search .................. 74/424.5, 74/425, 411, 388 PS, 409, 406, 89.17, 443, 74/461, 440; 180/444, 443
See application file for complete search history.

(56) References Cited

U.S. PATENT DOCUMENTS

| | | | |
|---|---|---|---|
| 3,203,268 A * | 8/1965 | Manoni et al. .................. 74/411 |
| 4,739,673 A * | 4/1988 | Ishikawa et al. ................ 74/493 |
| 6,470,993 B1 * | 10/2002 | Matsuda et al. ............... 180/444 |
| 6,520,042 B2 * | 2/2003 | Jammer et al. .................. 74/425 |
| 6,915,716 B2 * | 7/2005 | Doornbos et al. ............... 74/411 |
| 7,650,809 B2 * | 1/2010 | Bernhard et al. ............... 74/411 |
| 2004/0060379 A1 * | 4/2004 | Bernhard et al. .......... 74/388 PS |

FOREIGN PATENT DOCUMENTS

| | | |
|---|---|---|
| EP | 1 339 596 | 10/2004 |
| WO | WO 01/44694 | 6/2001 |
| WO | WO 2005/038303 | 4/2005 |

* cited by examiner

*Primary Examiner* — Robert Pezzuto
(74) *Attorney, Agent, or Firm* — McGlew and Tuttle, P.C.

(57) ABSTRACT

A spiral-toothed gear wheel for a rack and pinion steering. The spiral-toothed gear wheel includes a pinion, which meshes on the power take-off side with a toothed rack, and a spiral-toothed gear, which is arranged on the pinion on the drive side in such a way that they rotate in unison, and on which a torque caused by a steering power or/and steering assist power acts. The spiral-toothed gear is designed as a built-up gear and includes a gear rim, which is arranged, relative to the axial direction of the gear or of the pinion thereof, between two flanges. The gear rim is pushed over a hub formed at one of the flanges and is fitted together with the flanges in a positive-locking manner. One of the flanges, namely, the flange having the hub for the gear rim, is made in one piece with the pinion.

20 Claims, 2 Drawing Sheets

SPIRAL-TOOTHED GEAR WHEEL FOR RACK AND PINION STEERING

CROSS REFERENCE TO RELATED APPLICATIONS

This application is a United States National Phase application of International Application PCT/DE2007/000373 and claims the benefit of priority under 35 U.S.C. §119 of German Patent Application DE 10 2006 010 268.1 filed Mar. 2, 2006 the entire contents of which are incorporated herein by reference.

FIELD OF THE INVENTION

The present invention pertains to a spiral-toothed gear wheel for a rack and pinion steering, by means of which a steering power or steering assist power is transmitted to a toothed rack that is in functional connection with the wheels of a motor vehicle, which wheels are to be steered. A torque caused by a steering power or a steering assist power is converted by means of the gear into a translatory motion of the toothed rack, which will then be converted into a pivoting motion of the wheels via drag bearings. A corresponding gear comprises essentially a spiral-toothed gear, on which the torque caused by the steering power or the steering assist power acts, and a pinion, which transmits the motion on the power take-off side to the toothed rack, the spiral-toothed gear being arranged on the pinion on the drive side in such a way that they rotate in unison.

BACKGROUND OF THE INVENTION

A corresponding arrangement is described, for example, in EP 1 339 596 B1. In the arrangement shown in that document, the spiral-toothed gear, which is designed specifically as a worm gear here, is embodied by a built-up gear. Built-up gears, which frequently consist of metallic components to achieve the required strength, but frequently have a gear rim consisting of plastic especially to achieve quiet running at the same time, are known, in principle. Such a built-up gear is described, in addition, for example, in WO 2001/44694 A1.

However, the spiral-toothed gear known from EP 1 339 596 B1 as well as a built-up gear disclosed in WO 2005/038303 A1, which was published later, have the advantage over the built-up gear described in WO 2001/44694 A1 that they are self-centering. In these, the two outer disks, which together form the spiral-toothed gear with the gear rim, have axially directed projections, which pass through the gear rim and mesh with corresponding depressions of the respective other, opposite outer disk. As a result, self-centering is achieved, which leads to improved transmission of power and also simplifies the assembly of the spiral-toothed gear. However, it is common to all the above-mentioned solutions that the mounted spiral-toothed gear or gear must be pushed over a corresponding pinion for use in the steering gear of a rack and pinion steering. In view to the connection between the spiral-toothed gear and the pinion, which must be such as to rotate in unison, this makes it necessary to observe narrow shape and position tolerances of the parts, so that tolerances that may possibly nevertheless occur lead to refinishing or even to rejects, as a result of which the manufacturing costs increase in a disadvantageous manner. In addition, the effort needed for assembly to embody a steering gear comprising a built-up spiral-toothed gear and a pinion is still comparatively great.

In the solution described in EP 1 339 596 B1, ring-shaped spacers consisting of an elastic material, which have a certain buffering action in the axial, radial and even tangential directions according to the statements made in that document, are arranged between the two outer disks or flanges of the spiral-toothed gear and the gear rim thereof. However, it shall be pointed out that the damping effect of the spacers, which are designed as flat rings with a plurality of radially rising projections arranged distributed over the circumference, is still rather weak. However, due to their shape and the small thickness of material, the spacers disclosed in the document do not make it basically possible to affect the characteristics in a specific manner in the individual directions.

SUMMARY OF THE INVENTION

The object of the present invention is to propose a solution to design a spiral-toothed gear wheel for a rack and pinion steering, by which especially the shape and position tolerances of the parts forming the gear can be reduced or tolerances can be partly avoided. A corresponding spiral-toothed gear wheel shall, moreover, have a simple design, which makes it possible to reduce the effort needed for assembly. Furthermore, the solution to be found shall preferably make it possible to affect the damping characteristics in a specific manner concerning the torsional and radial damping characteristics.

The spiral-toothed gear wheel proposed for accomplishing the object for a rack and pinion steering comprises, a pinion, which meshes with a toothed rack on the power take-off side, and a spiral-toothed gear, which is arranged on the drive side on the pinion in such a way that they rotate in unison and on which acts a torque generated by a steering power and/or steering assist power. The spiral-toothed gear is designed as a built-up gear and comprises a gear rim, which is arranged between two flanges relative to the axial direction of the gear or the pinion thereof. The gear rim is pushed over a hub formed on one of the flanges and is fitted together with the flanges in a positive-locking connection. As was described already, the spiral-toothed gear is arranged on the pinion, namely, on the side located opposite the side meshing with the toothed rack, in such a way that they rotate in unison, for the functionally correct design of the gear. However, unlike in the state of the art, not all the components forming the built-up spiral-toothed gear are pushed over the pinion by press fit only according to the present invention. Rather, one of the flanges, namely, the flange having the hub for the gear rim, is made in one piece with the pinion. This one-piece design inherently leads to such an arrangement of the flange on the pinion that they rotate in unison. Due to the positive-locking connection of the other components of the built-up spiral-toothed gear to this flange, the entire spiral-toothed gear is arranged on the pinion in such a way that they rotate in unison.

Corresponding to a possible embodiment, the pinion consists of metal and is extrusion-coated with a plastic by an injection molding process to embody the connection to the flange and the hub formed on the flange. In another embodiment, the hub likewise consists of a metal, and the pinion and a metal ring forming the later hub are extrusion-coated together with a plastic to prepare the flange connected to it in one piece. The metal ring forming the hub does not pass completely through the disk forming the flange.

An especially advantageous embodiment of the present invention is given by the fact that the elements forming the spiral-toothed gear are connected to one another both without the use of screw connections and without riveting. The connection of the elements of the spiral-toothed gear is achieved in this embodiment by a transition to clamped and plug-in connections. To this end, the gear rim of the spiral-toothed gear is at first pushed over the hub of the flange made in one piece with the pinion and the other flange is then pushed over the pinion. The parts thus fitted together are finally held together by means of a clamping ring and are fixed together on the pinion in the axial position and in such a way that they rotate in unison, where said clamping ring is pushed over the pinion on the axial side of the pinion, which side is located opposite the flange made in one piece with the pinion and is caused to mesh with a groove at an end position. The aforementioned groove is designed, corresponding to one possibility, as a circumferential groove on the outer circumference of the pinion. However, if the hub provided on the flange made in one piece with the pinion consists of a metal, the circumferential groove may also be embodied by a recess prepared on the outer circumference of this hub. When the clamping ring snaps into the groove, the clamping ring is pressed axially against the axial outer surface of the second flange, which is not connected in one piece to the pinion, where said axial outer surface faces away from the gear rim. At the same time, elevations, which are formed on the inner axial lateral surfaces of the flanges and extend axially in the direction of the gear rim, mesh with corresponding depressions formed on the axial lateral surfaces of the gear rim. However, it is, of course, also conceivable that the aforementioned elevations are formed on the outer lateral surfaces of the gear rim and become meshed with corresponding depressions on the axially inner sides, i.e., on the sides of the flanges facing the gear rim.

The present invention is advantageously improved by ring-shaped elastomer damping elements being arranged between the flanges and the gear rim. These are preferably designed as O-rings and are shaped such that they have on their circumference a plurality of radially outwardly rising projections, which protrude into intermediate spaces between elevations, which rise from the flanges or/and the gear rim in the axial direction. In particular, good torsional and radial damping is advantageously achieved by means of the damping elements shaped in such a manner, and both the torsional characteristics and the radial characteristics can be affected within wide ranges by the dimensioning of the rings, i.e., for example, their material thickness or the specific design of the projections provided on the circumference of the O-rings.

The gear rim and the flange (the latter aside from at least the hub) made in one piece with the pinion preferably consist of a plastic, while the other flange may possibly also consist of a metal to increase the strength of the spiral-toothed gear.

The present invention will be explained once again in more detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
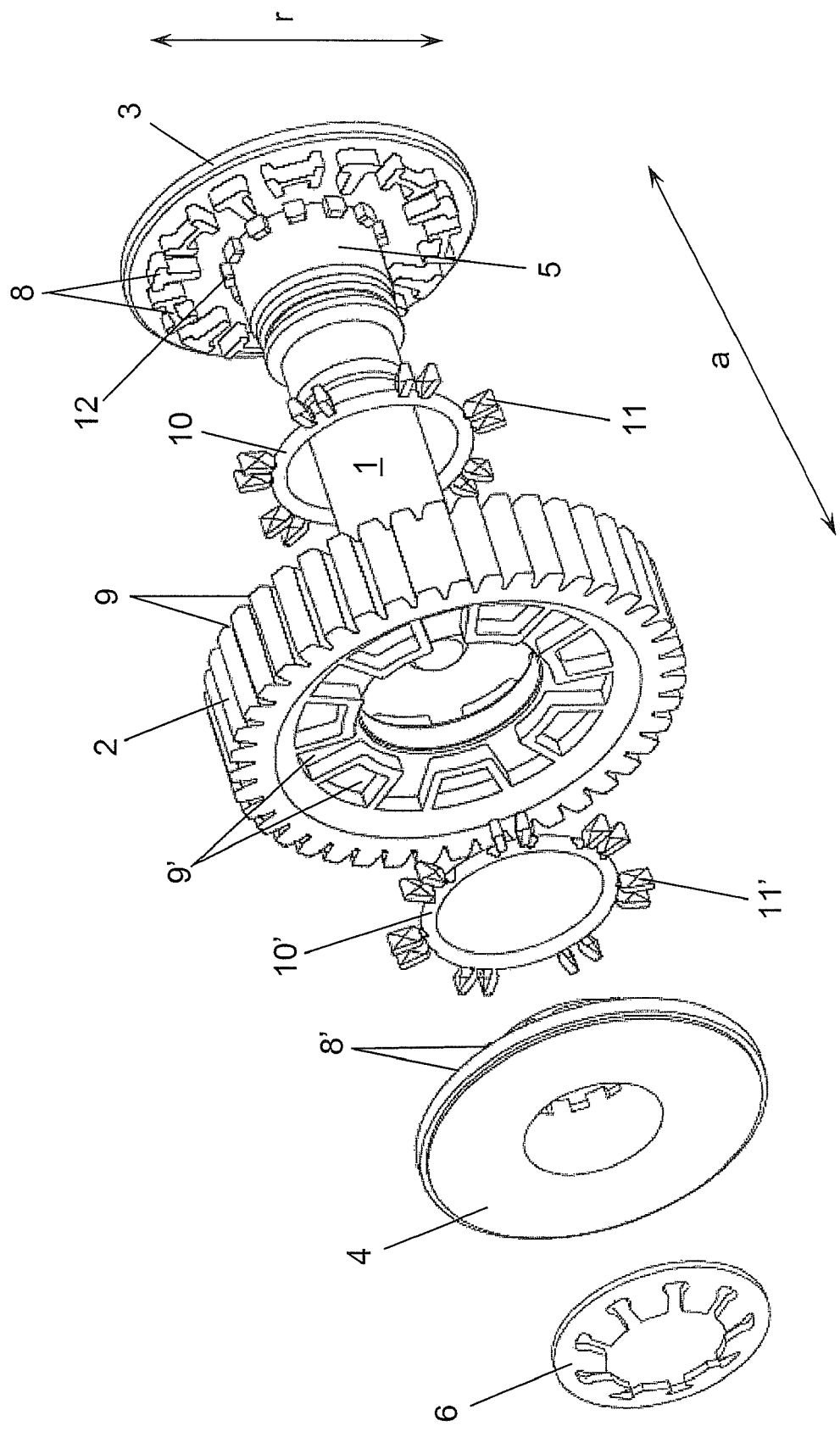
FIG. 1 is an exploded view of a possible embodiment of the gear according to the present invention and its components.

Referring to the drawings in particular, FIG. 1 shows a possible embodiment of the spiral-toothed gear wheel according to the present invention in an exploded view, in which essential components of the spiral-toothed gear wheel can be recognized. The gear comprises a shaft and the pinion 1, with a flange 3 arranged thereon at an axial end in such a way that they rotate in unison. This flange forms part of the built-up spiral-toothed gear 2, 3, 4 to be mounted on the pinion 1. As it were, it is an outer disk of the built-up spiral-toothed gear 2, 3, 4 comprising three components. During mounting, the spiral-toothed gear 2, 3, 4 is formed by fitting together said flange 3 with a gear rim 2 and another flange 4 arranged on the other side of the gear rim 2.

Unlike in the state of the art, flange 3, whose shoulder forms the hub 5 for the spiral-toothed gear 2, 3, 4, is not pushed over the pinion 1, but is made in one piece therewith. The connection leading to the formation of the inseparable unit between the flange 3 and the pinion 1 is brought about in an especially advantageous manner in the course of the shaping of the plastic during injection molding, and the pinion is extrusion-coated with plastic to form the flange. To mount the gear and hence the built-up gear 2, 3, 4, the gear rim 2 thereof is guided over the pinion 1 onto the shoulder of flange 3, which said shoulder forms the hub 5, the flange 4, which is to be arranged on the other side, is subsequently mounted, and a clamping ring 6 is finally pushed over the pinion 1, and said clamping ring 6 snaps, as it were, into a circumferential groove 7 formed on the circumference of the pinion 1 (see FIG. 2 in this connection) and fixes the parts of the spiral-toothed gear 2, 3, 4 in relation to one another in their axial positions and thus connects them rigidly to one another. Based on the connection to the flange 3 and the one-piece design of said flange with the pinion 1, all parts of the built-up spiral-toothed gear 2, 3, 4 are at the same time anchored on the pinion 1 in such a way that they rotate in unison. In addition, the mounting of the spiral-toothed gear 2, 3, 4 is carried out in the embodiment shown by inserting two O-rings 10, 10', which have special profiles each, between each of the two flanges 3, 4 and the gear rim 2. The components forming the built-up spiral-toothed gear 2, 3, 4, namely, the flanges 3, 4, the O-rings 10, 10' and the gear rim 2, are connected to one another in a positive-locking manner by the clamping ring 6 and a corresponding profiling of the axially inner surfaces of the flanges 3, 4 as well as of the axial outer surfaces of the gear rim 2. To this end, the flanges 3, 4 have axially inwardly extending elevations 8, 8', which mesh with corresponding recesses 9, 9' in a radially inner area of the two axial outer surfaces of the gear rim 2, under their toothed running surface.

As can be recognized, the shaping of the O-rings 10, 10' and that of the flanges 3, 4 are also coordinated with one another, so that the O-rings 10, 10' are positioned in their positions by projections 11, 11', which rise radially on their circumference and which come into contact during mounting between additional elevations 12 provided on the inner sides of both flanges. Unlike the spacers of the steering means described in EP 1 339 596 B1, the elastic O-rings 10, 10' have damping elements, which make it possible to affect the characteristics especially in the radial and torsional directions in a specific manner. This is achieved by the damping elements being designed not only as flat disks, as according to the above-mentioned document, but as O-rings 10, 10'. By varying the material thickness of the O-rings 10, 10' in the axial direction and/or in the radial direction r, the characteristics can be varied in the corresponding direction. However, the projections 11, 11' formed on the O-rings 10, 10' also have, in addition, a special shape at their radial ends. Improved torsional damping characteristic, which can be affected by the exact dimensioning of the projections 11, 11', is achieved by the projections 11, 11' expanding in a club-shaped manner at their radial ends.

However, the essential advantage of the spiral-toothed gear wheel designed according to the present invention results from the one-piece design of the flange 3 and the pinion 1. As a result, tolerances between these parts are avoided, and the inseparable unit formed by them immanently also leads to such a mounting of the flange 3 on the pinion 1 that these rotate in unison. At the same time, the gear rim 2 has a shape more favorable for the injection molding process due to the absence of axial openings and the elimination of screws or rivets for connecting the flanges 3, 4. Due to the transition to clamped and plug-in connections, mounting is, moreover, substantially simplified, and reliable axial fixation of the spiral-toothed gear 2, 3, 4 is achieved due to the flange 3 made in one piece with the pinion 1, on the one hand, and the clamping disk 6 or plate spring pushed over from the other side, on the other hand.

Figure 2:
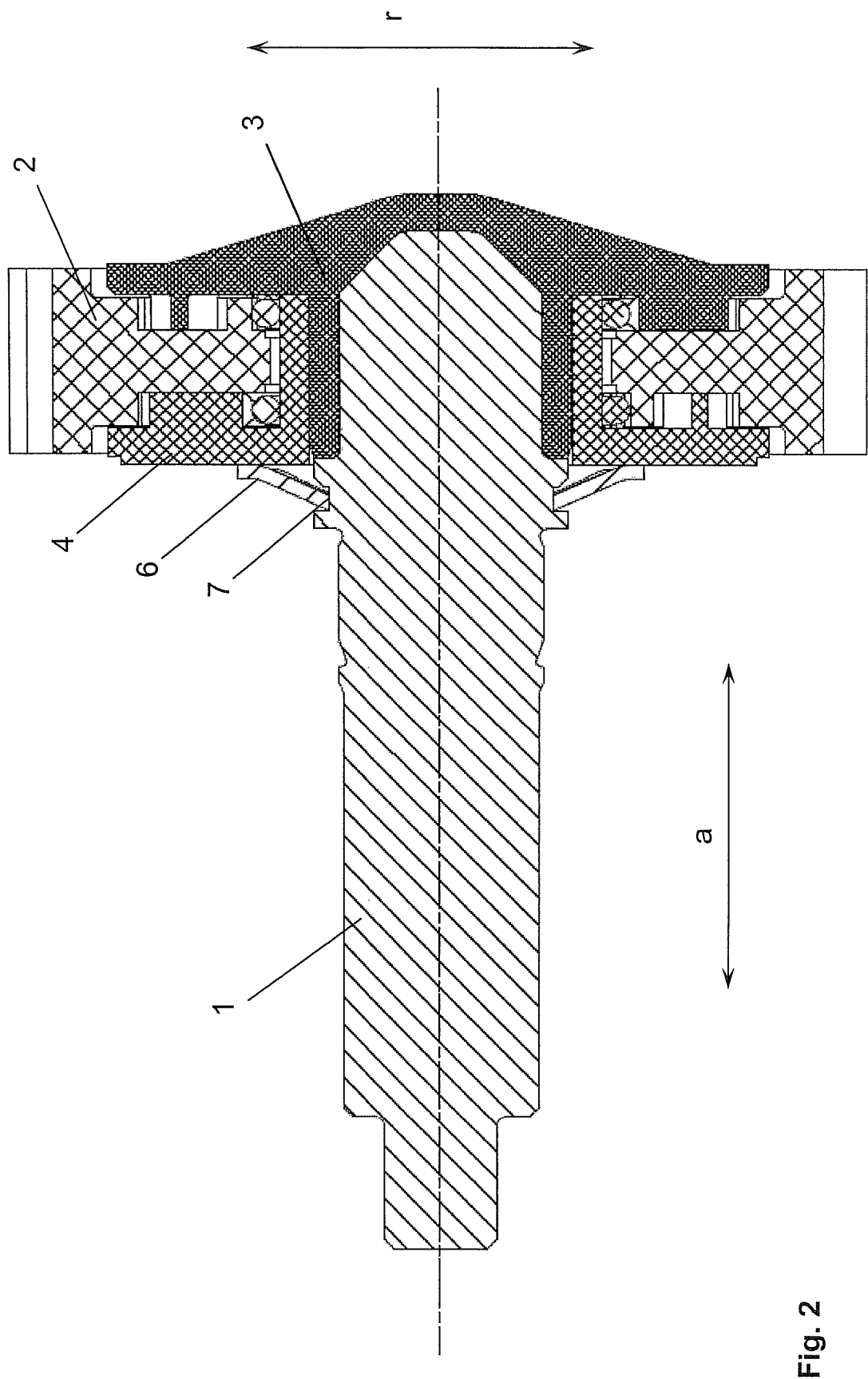
FIG. 2 is a sectional view showing the embodiment according to FIG. 1.

FIG. 2 shows the embodiment according to FIG. 1 in the mounted state, wherein the spiral-toothed gear wheel is shown in an axial sectional view. When the gear is used, the torque caused by a steering power or steering assist power acts on the built-up spiral-toothed gear 2, 3, 4 mounted in the above-described manner. Due to the fact that the flange 3 is arranged such that it rotates in unison and to the rigid connection of the other parts of the spiral-toothed gear 2, 3, 4 to this flange 3, the rotary motion generated hereby is transmitted to the pinion 1. This motion is transmitted on the power take-off side by the teeth of the pinion 1, which teeth are not shown in the figure, to a toothed rack, likewise not shown, at the axial end of the pinion 1, which is the left-hand end in the drawing, and converted in the process into a translatory motion of the toothed rack.

While a specific embodiment of the invention has been shown and described in detail to illustrate the application of the principles of the invention, it will be understood that the invention may be embodied otherwise without departing from such principles.

The invention claimed is:

1. A spiral-toothed gear wheel for a rack and pinion steering, the spiral-toothed gear wheel comprising:
   a pinion; and
   a spiral toothed gear formed as a as a built-up gear comprising a first flange with a hub, a second flange and a gear rim arranged between said first flange and said second flange and pushed over said hub, said gear rim, said first flange and said second flange having positive connection features providing a positive-lock fitting together of said gear rim, said first flange and said second flange, said first flange with said hub being made in one piece with said pinion, said spiral toothed gear meshing on a power take-off side with a toothed rack, said spiral-toothed gear being arranged on a drive side on said pinion, torque generated by one or more of a steering power and a steering assist power acting on said pinion and said pinion and said spiral-toothed gear rotating in unison.

2. A spiral-toothed gear wheel in accordance with claim 1, wherein said pinion consists of a metal and is extrusion-coated with a plastic to form said flange with said hub and to form said one piece.

3. A spiral-toothed gear wheel in accordance with claim 2, further comprising a clamping ring wherein:
   said first flange made in one piece with the pinion, said gear rim, which is in contact with said first flange with an axial lateral surface of said gear rim, and said second flange, arranged at another axial lateral surface of said gear rim are held together by means of said clamping ring and are fixed on said pinion together in an axial position in such a way that said first flange, said second flange and said gear rim rotate in unison;
   said clamping ring is pushed over said pinion on an axial side located opposite said first flange and is caused to mesh with a groove extending circumferentially on an outer circumference of said pinion or a groove extending circumferentially on the outer circumference of said hub, said hub consisting of a metal, whereby said clamping ring presses axially against an axial lateral surface of said second flange, which said axial lateral surface faces away from said gear rim, and
   said positive connection features comprise elevations formed on an inner axial lateral surface of said first flange and said second flange and extend axially in a direction of said gear rim and mesh with depressions of said gear rim or a depression formed on inner axial lateral surfaces of said flanges mesh with elevations, which are formed on the axial lateral surfaces of the gear rim and extend axially in a direction of said flanges.

4. A spiral-toothed gear wheel in accordance with claim 1, wherein the pinion and the hub consist of a metal and are extrusion-coated with plastic together to form the flange and to form said one piece.

5. A spiral-toothed gear wheel in accordance with claim 4, further comprising a clamping ring wherein:
   said first flange made in one piece with the pinion, said gear rim, which is in contact with said first flange with an axial lateral surface of said gear rim, and said second flange, arranged at another axial lateral surface of said gear rim are held together by means of said clamping ring and are fixed on said pinion together in an axial position in such a way that said first flange, said second flange and said gear rim rotate in unison;
   said clamping ring is pushed over said pinion on an axial side located opposite said first flange and is caused to mesh with a groove extending circumferentially on an outer circumference of said pinion or a groove extending circumferentially on the outer circumference of said hub, said hub consisting of a metal, whereby said clamping ring presses axially against an axial lateral surface of said second flange, which said axial lateral surface faces away from said gear rim, and said positive connection features comprise elevations formed on an inner axial lateral surface of said first flange and said second flange and extend axially in a direction of said gear rim and mesh with depressions of said gear rim or a depression formed on inner axial lateral surfaces of said flanges mesh with elevations, which are formed on the axial lateral surfaces of the gear rim and extend axially in a direction of said flanges.

6. A spiral-toothed gear wheel in accordance with claim 1, wherein ring-shaped elastomer damping elements are arranged between said flanges and said gear rim.

7. A spiral-toothed gear wheel in accordance with claim 1, further comprising: O-rings formed of an elastomer material, said O-rings being arranged as damping elements between said first flange and said second flange and said gear rim, said O-rings having a plurality of projections rising outwardly radially on a circumference thereof, which said projections protrude into intermediate spaces between elevations rising from one or more of said first flange, said second flange and said gear rim, in the axial direction.

8. A spiral-toothed gear wheel in accordance with claim 1, wherein said gear rim and said first flange, except for said hub, are formed of a plastic, an said second flange is formed of a metal.

9. A spiral-toothed gear wheel in accordance with claim 1, wherein one side of said gear rim having a first continuous surface defining a plurality of first recesses and at least a portion of an opening for said pinion, another side of said gear rim having a second continuous surface defining a plurality of second recesses and at least another portion of said opening for said pinion, said first flange having a plurality of first elevations, each of said first elevations being arranged in one of said first recesses, said second flange having a plurality of second elevations, each of said second elevations being arranged in one of said second recesses.

10. A spiral-toothed gear wheel for a rack and pinion steering, the spiral-toothed gear wheel comprising:
a pinion;
a hub;
a first flange, said first flange with said hub being made in one piece with said pinion;
a second flange; and
a gear rim arranged between said first flange and said second flange and pushed over said hub;
positive locking means including positive connection features of each of said gear rim, said first flange and said second flange for providing a positive-lock fitting together of said gear rim, said first flange and said second flange, said spiral toothed gear meshing on a power take-off side with a toothed rack, said spiral-toothed gear being arranged on a drive side on said pinion, torque generated by one or more of a steering power and a steering assist power acting on said pinion and said pinion and said spiral-toothed gear rotating in unison.

11. A spiral-toothed gear wheel in accordance with claim 10, wherein said pinion consists of a metal and is extrusion-coated with a plastic to form said flange with said hub and to form said one piece.

12. A spiral-toothed gear wheel in accordance with claim 11, further comprising a clamping ring wherein:
said first flange made in one piece with the pinion, said gear rim, which is in contact with said first flange with an axial lateral surface of said gear rim, and said second flange, arranged at another axial lateral surface of said gear rim are held together by means of said clamping ring and are fixed on said pinion together in an axial position in such a way that said first flange, said second flange and said gear rim rotate in unison;
said clamping ring is pushed over said pinion on an axial side located opposite said first flange and is caused to mesh with a groove extending circumferentially on an outer circumference of said pinion or a groove extending circumferentially on the outer circumference of said hub, said hub consisting of a metal, whereby said clamping ring presses axially against an axial lateral surface of said second flange, which said axial lateral surface faces away from said gear rim, and
said positive connection features comprise elevations formed on an inner axial lateral surface of said first flange and said second flange and extend axially in a direction of said gear rim and mesh with depressions of said gear rim or a depression formed on inner axial lateral surfaces of said flanges mesh with elevations, which are formed on the axial lateral surfaces of the gear rim and extend axially in a direction of said flanges.

13. A spiral-toothed gear wheel in accordance with claim 10, wherein the pinion and the hub consist of a metal and are extrusion-coated with plastic together to form the flange and to form said one piece.

14. A spiral-toothed gear wheel in accordance with claim 13, further comprising a clamping ring wherein:
said first flange made in one piece with the pinion, said gear rim, which is in contact with said first flange with an axial lateral surface of said gear rim, and said second flange, arranged at another axial lateral surface of said gear rim are held together by means of said clamping ring and are fixed on said pinion together in an axial position in such a way that said first flange, said second flange and said gear rim rotate in unison;
said clamping ring is pushed over said pinion on an axial side located opposite said first flange and is caused to mesh with a groove extending circumferentially on an outer circumference of said pinion or a groove extending circumferentially on the outer circumference of said hub, said hub consisting of a metal, whereby said clamping ring presses axially against an axial lateral surface of said second flange, which said axial lateral surface faces away from said gear rim, and
said positive connection features comprise elevations formed on an inner axial lateral surface of said first flange and said second flange and extend axially in a direction of said gear rim and mesh with depressions of said gear rim or a depression formed on inner axial lateral surfaces of said flanges mesh with elevations, which are formed on the axial lateral surfaces of the gear rim and extend axially in a direction of said flanges.

15. A spiral-toothed gear wheel in accordance with claim 10, wherein ring-shaped elastomer damping elements are arranged between said flanges and said gear rim.

16. A spiral-toothed gear wheel in accordance with claim 10, further comprising: O-rings formed of an elastomer material, said O-rings being arranged as damping elements between said first flange and said second flange and said gear rim, said O-rings having a plurality of projections rising outwardly radially on a circumference thereof, which said projections protrude into intermediate spaces between elevations rising from one or more of said first flange, said second flange and said gear rim, in the axial direction.

17. A spiral-toothed gear wheel in accordance with claim 10, wherein said gear rim and said first flange, except for said hub, are formed of a plastic, an said second flange is formed of a metal.

18. A spiral-toothed gear wheel in accordance with claim 10, wherein one side of said gear rim having a first continuous surface defining a plurality of first recesses and at least a portion of an opening for said pinion, another side of said gear rim having a second continuous surface defining a plurality of second recesses and at least another portion of said opening for said pinion, said first flange having a plurality of first elevations, each of said first elevations being arranged in one of said first recesses, said second flange having a plurality of second elevations, each of said second elevations being arranged in one of said second recesses.

19. A spiral-toothed gear wheel for a rack and pinion steering, the spiral-toothed gear comprising:
a pinion;
a hub;
a first flange, said first flange being integrally connected with said hub and said pinion to form a one-piece hub flange pinion structure;
a second flange; and a gear rim arranged between said first flange and said second flange and pushed over said hub;

a positive locking means including positive connection features of each of said gear rim, said first flange and said second flange for providing a positive-lock fitting together of said gear rim, said first flange and said second flange, said spiral toothed gear meshing on a power take-off side with a toothed rack, said spiral-toothed gear being arranged on a drive side on said pinion, torque generated by one or more of a steering power and a steering assist power acting on said pinion and said pinion and said spiral-toothed gear rotating in unison.

20. A spiral-toothed gear wheel in accordance with claim 19, further comprising:

a clamping ring, said clamping ring engaging said second flange, at least a portion of said clamping ring being arranged in a groove extending circumferentially on an outer circumference of said pinion or a groove extending circumferentially on the outer circumference of said hub, wherein one side of said gear rim has a first continuous surface defining a plurality of first recesses and at least a portion of an opening for said pinion, another side of said gear rim having a second continuous surface defining a plurality of second recesses and at least another portion of said opening for said pinion, said first flange having a plurality of first elevations, each of said first elevations being arranged in one of said first recesses, said second flange having a plurality of second elevations, each of said second elevations being arranged in one of said second recesses.

\* \* \* \* \*